April 28, 1964     A. W. WILKERSON     3,131,342
TRANSISTOR AMPLIFIER FOR CONTROLLING SHAFT SPEED
Filed Aug. 25, 1960
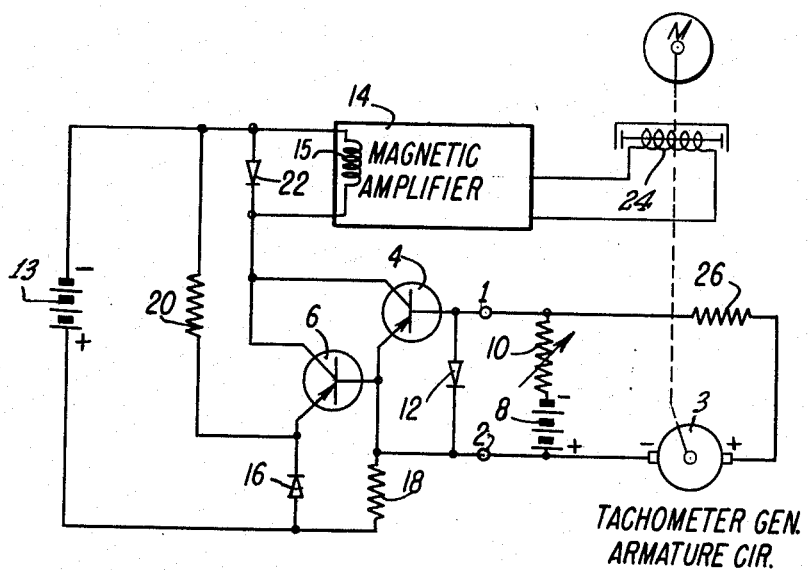
INVENTOR.
ALAN W. WILKERSON
BY
ATTYS.

3,131,342
TRANSISTOR AMPLIFIER FOR CONTROLLING SHAFT SPEED
Alan W. Wilkerson, Racine, Wis., assignor to The Louis Allis Co., Milwaukee, Wis., a corporation of Wisconsin
Filed Aug. 25, 1960, Ser. No. 51,810
2 Claims. (Cl. 318—327)

This invention relates in general to a control circuit and in particular to a control circuit adapted to respond to a plurality of current control signals.

One of the difficulties which arise with conventional control circuits that are responsive to the composite of a plurality of control signals is that for effective control the composite signal must be maintained within a comparatively narrow signal range. However, specifically in the usual circumstance of matched impedance between the control circuit and the signal sources, the signal sources must necessarily be connected in series which also means that each of the sources must maintain a substantial signal in order not to vary its apparent impedance to the control circuit signal. This means that the sources can never go to zero signal and for that matter must never vary widely. Such limitations on the signal sources place obvious limitations on the kind and effectiveness of control that can be provided by the control circuit.

It is, therefore, an object of this invention to provide a control circuit which is directly responsive to a broad range of composite control signals and wherein control signals may be added or deleted without affecting the operation of the control circuit.

Another object of the invention is to provide a control circuit which may be readily utilized in systems utilizing a plurality of control signals, and which is adaptable to the regulation of current flow in direct response to current control signals and wherein control signals may be added or deleted without affecting the operation of the control circuit.

A further object of this invention is to provide a transistorized control circuit for controlling the current flow through current responsive devices directly in accordance with current control signals provided thereto from a plurality of signal sources.

Briefly, the inventive control circuit may be utilized for example to effect control of the speed of a driver shaft. A reference signal corresponding to the desired shaft speed is applied to the control circuit and in opposition thereto the control circuit has applied at its input a signal proportional to the shaft speed derived by means of a direct current tachometer generator suitably attached to the shaft. The control circuit responds to the difference in the aforementioned signals and controls the energization to the control winding of a magnetic amplifier, which in turn controls the current which is applied to, for example, the field circuit of a direct current generator supplying armature voltage to a direct current shunt wound motor or to the field coil of an eddy current clutch extending between a constant speed motor and a driven shaft. A balance is subsequently reached and the driven shaft is rotated at a speed determined by the reference voltage. Any incipient variations in the speed condition of the shaft will be reflected to the control circuit by the tachometer generator as an increased or decreased signal, which will in turn cause corresponding changes in the field current supplied by the magnetic amplifier so as to maintain the speed of the driven shaft substantially constant at the predetermined level as determined by the reference signal.

The transistorized control circuit of the invention is a current responsive device characterized as having a low input impedance in both the forward and reverse directions so that it is particularly well adapted for use with high impedance signal sources. Accordingly, it is responsive without differentiation to one or more parallel connected high impedance signal sources.

Other features and objects of the invention will become readily apparent if the following is viewed in light of the drawing, wherein one embodiment of the invention is illustrated.

Referring now to the drawing, there is schematically illustrated therein the armature circuit 3 of a tachometer generator providing a control signal proportional to the speed of the rotating shaft to be controlled.

The tachometer generator circuit 3 is connected to the rotating shaft and the output of the tachometer generator armature circuit 3 is transmitted to the base-emitter electrodes of transistor 4 through the control signal isolating resistor 26. A reference or speed setting signal source 8, with polarities as shown, is also transmitted to the base-emitter electrodes of the transistor 4, but through a circuit isolating variable resistor 10. Connected across the base-emitter electrodes of transistor 4 is the switching diode 12, the function of which will be explained hereinafter.

What has been defined may be termed the input section of the control circuit. It should be understood that a plurality of control signals of varying polarities may be connected to the input section of the control circuit. However, only two control signals are shown in the drawing for simplicity. This input section of the control circuit has significant merit, in that the control signal from the tachometer generator armature circuit 3 and the control signal from the speed setting source 8 are independent of one another as will be seen hereinafter. Diode 12 is connected across the base-emitter electrodes of transistor 4 such that diode 12 is conducting when the base-emitter electrodes are biased so as to be non-conducting. Transistor 4 is illustrated in the drawing as being a PNP type transistor, and, consequently, will be cut off or non-conducting when the base electrode is positive with respect to the emitter electrode.

The input impedance as seen from points 1 and 2 is determined by the base-emitter impedance of transistor 4 when transistor 4 is in a conducting or "on" state, and by the forward or conducting impedance of the diode 12 when transistor 4 is in a non-conducting state. The provision of diode 12 insures that the input impedance as seen from points 1 and 2 will not vary significantly as would occur if the diode 12 was not present. If diode 12 was not present the input impedance as seen from points 1 and 2 would vary from a relatively low impedance when transistor 4 is in the conducting state to a comparatively high impedance when transistor 4 is in the non-conducting state.

Resistors 26 and 10 have been described as isolating resistors, and in order to accomplish this function resistors 26 and 10 must be chosen so as to be very much larger than the input impedance of the transistor 4 as seen from points 1 and 2. Thereafter, each control signal source, such as the tachometer generator armature circuit 3 and the speed setting source 8 sees a very high impedance in series with a comparatively low impedance and may be, therefore, viewed as a current generator, i.e. comparatively small changes in the load or input impedance of the transistor 4, as seen from points 1 and 2, will not effect the current output of the control signal circuits. The control signal circuits being the parallel circuits of tachometer generator armature circuit 2 in series with the isolating resistor 26 in parallel with the speed setting source 8 and the isolating resistor 10. Therefore, if a number of circuits are added in parallel at the points 1 and 2, and if these circuits are high impedance circuits and, consequently, current generators, as has been previously defined, then each individual circuit will not be effected by any of the other circuits and, consequently, a plurality of circuits may be connected across the points 1 and 2 which will be entirely independent of one another.

If diode 12 was not provided and connected as described, then the input impedance of the transistor 4, as seen from points 1 and 2, would vary from a comparatively small input impedance to a high impedance and would thusly compare in magnitude with the isolating resistors of the individual control signal circuits and a comparatively large signal voltage might appear across the base emitter electrodes of transistor 4 which could cause transistor 4 to be damaged by excessive back biasing.

Now turning to the amplifier section of the control circuit, there is illustrated therein a pair of direct coupled transistors 4 and 6, which amplify the signals which are provided by the control signal circuits containing the tachometer generator armature circuit 3 and the speed setting source 8. The amplifier section of the control circuit is provided with a power source 13, which is connected in the collector-emitter paths of the transistors 4 and 6. One output terminal of the power source 13 is connected to the collector electrodes of transistors 4 and 6 through the control winding 15 of the magnetic amplifier 14. The other output terminal of the power source 13 is connected to the emitter of transistor 6 through constant voltage drop diode 16 (i.e. a diode which breaks down at a threshold voltage and maintains the same voltage drop thereacross, even if the current increases), and to the emitter of the transistor 4 through a resistor 18. A diode 22 that shunts the control winding 15 is provided so as to prevent a discharge path for inductive loads, such as the magnetic amplifier 14. The magnetic amplifier 14 is connected in the collector-emitter path of the transistors 6 and 4, and the output of the magnetic amplifier 14 is connected to the field coil 24, for example, of an eddy current clutch, as shown, or of a generator supplying direct current armature voltage to the motor to be controlled. Transistors 6 and 4 are connected in a somewhat cascaded manner, the collectors of both transistors 6 and 4 are connected to the magnetic amplifier 14 and the emitter of transistor 4 is connected to the base of transistor 6.

It must be noted before beginning an operative description of the above described circuitry, that many, if not most, of the practical applications of transistorized control equipment require operation at high ambient temperatures. The magnitude of the temperature is such that the thermal leakage or extrinsic conduction of the transistors make it difficult or impossible to turn the control equipment completely off without the taking of special precautions. A satisfactory method of assuring shut-off of a transistor amplifier is to apply to the transistors a small voltage of a potential opposite to that required for conduction or operation. For the PNP transistors shown in FIGURE 1, this usually takes the form of a negative potential on the emitter or a positive potential on the base. In the circuit described herein shut-off is accomplished by applying a negative potential to the emitter of transistor 6 and a positive potential to the base of transistor 4.

A small input control current flowing from terminal 2 through the emitter of transistor 4, thence to the base of transistor 4 and terminal 1 permits a larger current to flow through the emitter collector path of transistor 4. The emitter-collector path of transistor 4 includes the positive terminal of power source 13, resistor 18, the emitter and collector electrodes of transistor 4, control winding 15 of magnetic amplifier 14 and the negative terminal of power source 13. Additionally, a parallel current path exists from power source 13 through constant voltage drop diode 16 and resistor 20.

The currents passing through constant voltage drop diode 16 and resistor 18 allow the upper end of both elements as seen in the drawing to assume a negative potential with respect to the lower end of both of these elements. Inasmuch as diode 16 is a constant voltage drop device, the potential drop thereacross remains constant. The voltage drop across resistor 18 varies with the amount of current therethrough. The potential at the upper end of resistor 18 may be, depending on the current, either of greater or lesser magnitude than the potential at the upper end of constant voltage drop device 16. When the latter occurs, transistor 6 is inoperable or shut-off because the emitter is at a negative potential with respect to the base. This situation exists when the current flow through the emitter-collector path of transistor 4 including resistor 18 is relatively small. At all other times the upper end of resistor 18 will be more negative than the upper end of constant voltage drop diode 16 making the base of transistor 6 more negative than the emitter thereby placing transistor 6 in a conducting state.

Thus, as the control current through the base emitter path of transistor 4 is increased, the current through the emitter-collector path of transistor 4 increases, allowing a larger current to flow through resistor 18. The potential at the upper end of resistor 18 varies with the increase in current in accordance with Ohm's law. The base terminal of transistor 6 becomes more negative with respect to the emitter of transistor 6 due to the increased current, and transistor 6 is placed in a conducting state where it is capable of amplification. When transistor 6 becomes conducting, current flows from positive terminal of power source 13 through constant voltage drop diode 16, through the emitter-collector path of transistor 6, control winding 15 of magnetic amplifier 14 and the negative terminal of power source 13.

For further increases in control current transistors 4 and 6 operate as an ordinary cascaded transistor amplifier.

When the control signal is reduced the operation of constant voltage drop diode 16 and resistor 18 is reversed, i.e. transistor 6 remains conducting until the current through resistor 18 is of such a small magnitude that the potential at the upper end of resistor 18 is greater than the potential at the upper end of constant voltage drop diode 16. At this point the negative potential at the emitter terminal of transistor 6 with respect to the base of transistor 6 effectively prevents further action by transistor 6.

With no control signal, transistor 4 is forced off by the positive potential at the upper end of diode 12 created by any negative feedback signal current.

Transistor 6 increases the current carrying capacity of the amplifier section of the control circuit. Therefore, an increase or decrease in signal, as applied to the emitter-base path of transistor 4 will cause a subsequent increase or decrease in the impedance presented to the power source 12, and will, therefore, alter the current flow through the control winding of the magnetic amplifier 14 from the combination of transistors 4 and 6. An increase or decrease in the input of the magnetic amplifier 14 causes a subsequent increase or decrease in the supply generator field current, which in turn causes an increase or decrease in the armature voltage presented to the direct current shunt wound motor, which will cause a decrease or increase in the motor speed.

The operation of the control circuit can be characterized as follows. Assuming that the output of the tachometer generator 3 is zero (shaft speed is zero) and that the speed setting source 8 has been set to establish a preferred speed. The control current input signal to transistor 4 from source 8 through isolating resistor 10, with the polarity as shown, will bias transistor 4 conductive in the emitter-base path thereby causing conduction in the emitter-collector path. At a relatively small level of conduction, transistor 6 becomes operative in manner described to provide a further amplified control signal current to the control winding 15.

This cascade effect wherein both transistor 4 and transistor 6 are conducting greatly amplifies the input current signal so that the magnetic amplifier 14 is in normal starting condition, driven to saturation. Maximum energy is thereby provided to the field coil 24 in the normal starting condition to bring the shaft speed quickly up to the established preferred speed.

As the shaft speed increases from zero to the established preferred speed, the output of the tachometer generator increases accordingly to provide bucking current for the current signal from the reference signal source 8. Accordingly, the composite current input signal to transistor 4 begins to diminish and with it the magnitude of the current control signal provided to the control or input winding 15 of the magnetic amplifier 14. Finally equilibrium is achieved between the current input signal to the transistor 4 and the shaft speed and the shaft rotates at the preferred speed.

The circuit illustrated in this drawing only provides one input for clarity accompanied by the bucking feedback voltage generated by the tachometer generator armature circuit 3. In such a situation, the transistor 4 may never be driven to cut-off. However, this control circuit may be utilized with signals such as a limit signal, i.e. a signal which will cause the motor to be controlled to be shut off for a period of time. And in such a situation, the signal delivered to the base-emitter electrodes of transistor 4 will cut off transistor 4 and the input impedance regulating properties of the diode 12 will maintain the input impedance to the transistor 4 as seen from points 1 and 2 relatively low.

In conclusion what has been described is a control circuit to which a plurality of control signals may be connected, and which when connected will be independent of one another and which may be connected or disconnected without disturbing the remainder of the circuit.

What has been described is what is believed to be the preferred embodiment of the invention. However, various modifications and alterations may be made without departing from the scope of the invention and such modifications and alterations are intended to be covered by the claims which follow.

What is claimed is:

1. A control circuit adapted to amplify a plurality of control signals and wherein control signals may be added or deleted without effecting the control circuit comprising: a first transistor having a collector, an emitter and a base, a first resistor connected to said emitter of said first transistor, a second transistor having a collector, an emitter and a base, a constant voltage drop diode connected to said emitter of said second transistor, a second resistor connected to said emitter of said second transistor, a magnetic amplifier having a pair of input terminals, a direct current power source, said collector of said first transistor and said collector of said second transistor connected to one of said input terminals of said magnetic amplifier, said emitter of said first transistor connected to said base of said second transistor, one polarity of said power source connected to the other input terminal of said magnetic amplifier and said second resistor, the other polarity of said power source connected to said first resistor and said constant voltage drop diode, a second diode connected to said base and said emitter of said first transistor and in a manner so as to be conducting when the base-emitter path of said first transistor is non-conducting, a plurality of input control signal sources connected in parallel with said base and emitter electrodes of said first transistor, and a plurality of high impedance resistors connected in series with said plurality of control signal sources, the impedance of said high impedance resistors as compared to the impedance of said base-emitter path of said first transistor when said first transistor is in a conductive state being large enough to render the circuits containing said control signal sources and said high impedance resistors constant current generators, whereby individual control signal sources may be added or deleted without effecting the control circuit, and wherein said first transistor alone amplifies input control signals below a predetermined level as determined by said constant voltage drop diode and said first transistor and said second transistor amplify input control signals above said predetermined level.

2. A circuit for controlling the speed of a rotating shaft by supplying a controlled current to a field coil that dictates the speed of the shaft; which circuit comprises means responsive to the rotation of the shaft for providing a signal proportional to the speed thereof; a reference signal source for producing a signal corresponding to the desired speed of rotation of said shaft; a first transistor comprising a collector, an emitter and a base; said responsive means and said reference signal source being connected in parallel and in opposed relation in the base-emitter path of said first transistor; said responsive means and said reference signal source each having an impedance element connected in series therewith; the impedance of each of said impedance elements being substantially greater than the impedance of the base-emitter path of said first transistor when in a conductive state; a second transistor having an emitter, a collector and a base; said collector of said second transistor being connected to the collector of said first transistor and the base of said second transistor being connected in the emitter path of said first transistor; a constant voltage drop diode connected in the emitter path of said second transistor; a source of D.C. potential having a first output terminal thereof connected in the emitter path of said first transistor; a magnetic amplifier having a pair of input and output terminals; one of said input terminals of said magnetic amplifier being connected to the collector of said first transistor and to the collector of said second transistor; the other of said input terminals of said magnetic amplifier being connected to a second output terminal of said source of potential; the output terminals of said magnetic amplifier being connected to the field coil; and said constant voltage drop diode being connected to the first output terminal of said source of potential so that a constant voltage drop is maintained across said diode.

References Cited in the file of this patent

UNITED STATES PATENTS

| | | |
|---|---|---|
| 2,647,957 | Mallinckrodt | Aug. 4, 1953 |
| 2,767,364 | Guggi | Oct. 16, 1956 |
| 2,809,339 | Guggi | Oct. 8, 1957 |
| 2,847,632 | Harvey et al. | Aug. 12, 1958 |
| 2,867,763 | Sichling | Jan. 6, 1959 |
| 2,967,991 | Deuitch | Jan. 10, 1961 |
| 2,976,475 | Dodge | Mar. 21, 1961 |
| 2,977,523 | Cockrell | Mar. 28, 1961 |
| 3,026,463 | Wolke et al. | Mar. 20, 1962 |
| 3,037,157 | Young | May 29, 1962 |